(12) United States Patent
Ankenman et al.

(10) Patent No.: US 7,017,675 B2
(45) Date of Patent: Mar. 28, 2006

(54) ONE-PASS PRIMARY TILLAGE MACHINE

(75) Inventors: Thomas W. Ankenman, Hutchinson, KS (US); John T. Kurtz, Hutchinson, KS (US)

(73) Assignee: Krause Plow Corporation, Inc., Hutchinson, KS (US)

( * ) Notice: Subject to any disclaimer, the term of this patent is extended or adjusted under 35 U.S.C. 154(b) by 0 days.

(21) Appl. No.: 10/901,775

(22) Filed: Jul. 29, 2004

(65) Prior Publication Data

US 2006/0021769 A1    Feb. 2, 2006

(51) Int. Cl.
*A01B 49/02* (2006.01)
*A01B 5/00* (2006.01)

(52) U.S. Cl. ................ 172/146; 172/142; 172/153; 172/156; 172/181; 172/178

(58) Field of Classification Search ............ 172/314, 172/133, 139, 142, 145–153, 156, 157, 174, 172/175, 177, 180, 181, 195, 196, 178
See application file for complete search history.

(56) References Cited

U.S. PATENT DOCUMENTS

| | | | | |
|---|---|---|---|---|
| 2,352,963 A | | 7/1944 | McMahon | |
| 2,353,963 A | * | 7/1944 | Landesman | ................ 15/185 |
| 2,455,147 A | * | 11/1948 | Traver | ................ 280/469 |
| 4,245,706 A | | 1/1981 | Dietrich, Sr. | |
| 4,403,662 A | | 9/1983 | Dietrich, Sr. | |
| 4,542,793 A | | 9/1985 | Dietrich, Sr. | |
| 4,724,910 A | * | 2/1988 | Wheeler | ................ 172/464 |
| 4,729,435 A | * | 3/1988 | Urich | ................ 172/196 |
| 4,762,181 A | * | 8/1988 | Cox | ................ 172/196 |
| 5,020,604 A | * | 6/1991 | Peck | ................ 172/177 |
| 5,080,178 A | | 1/1992 | Dietrich, Sr. | |
| 5,590,721 A | | 1/1997 | Van Mill | |
| 5,640,914 A | * | 6/1997 | Rawson | ................ 111/140 |
| 5,743,338 A | | 4/1998 | Gomez et al. | |
| 6,276,462 B1 | | 8/2001 | Dietrich, Sr. | |
| 6,554,078 B1 | * | 4/2003 | McDonald | ................ 172/69 |
| 6,578,642 B1 | | 6/2003 | Cox et al. | |
| 6,681,868 B1 | * | 1/2004 | Kovach et al. | ................ 172/701 |
| 6,761,120 B1 | | 7/2004 | Kovach et al. | |

OTHER PUBLICATIONS

Brochure—Sunflower Brochure entitled Primary Tillage Tools (BAC 25011/6/02).
Brochure—Case IH Brochure entitled ecolo-tiger® SERIES—Primary Tillage yield-till system (AE 332019-R).
Brochure—Case IH 6750 Parabolic Chisel, 6700 Coulter Chisel (AE 364099—R).
Brochure—Case IH MRX690 Mulch-Till Ripper (AE 471091).
Brochure—John Deere Primary Tillage (DSAA8468 Litho in U.S.A. (02-05) (Front page, pp. 12, 13, 14, 15, 20, 21 and Back page).
Brochure—Blue Jet TillagePro (AP.9.98.2.5M).

(Continued)

*Primary Examiner*—Victor Batson
(74) *Attorney, Agent, or Firm*—Hovey Williams LLP (57) ABSTRACT

A one-pass primary tillage machine provides a combination of shallow and deep tillage, residue cutting and mixing, and clod size reduction and leveling of the field to prepare the field for the next planting season. A front group of flat coulters slice through the residue to reduce its size, followed by deep shanks that improve the tilth of the soil to a point below the intended planting depth. Following the shanks, a group of concavo-convex conditioning discs mix the residue with the soil, reduce clod size, and level the field.

18 Claims, 10 Drawing Sheets

OTHER PUBLICATIONS

Brochure—Brent Earthquake disk ripper (BEQ100120-5M7).
Brochure—BRENT CPC2000 Disk Ripper (CPC8910010M1).
Brochure—EARTHMASTER—Models 1700, 2200 (copyright 2002 EM-0502-08P).
Brochure—Brillion Soil Commander II (Form No. SCll-129-N).
Brochure—Great Plains Verti-Till 7300 (front and back).
Brochure—Landoll Model 2210 Weatherproofer (front and back).

* cited by examiner

ONE-PASS PRIMARY TILLAGE MACHINE

RELATED APPLICATION

The present application is related to contemporaneously filed application Ser. No. 10/901,776 titled "Residue Managing Attachment for Primary Tillage Machine."

TECHNICAL FIELD

The present invention relates to the field of agricultural tillage equipment and, more particularly, to a machine having particular utility as a primary fall tillage tool with the ability to leave the field suitably finished with minimal requirements for additional tillage prior to spring planting.

BACKGROUND AND SUMMARY

It is known in the art to provide single-pass tillage implements which perform both shallow and deeper, primary tillage in a single pass. Typically, gangs of concavo-convex discs are utilized to perform the shallow tillage, while behind the discs sturdy shanks with various types of points are utilized to perform the deeper tillage. The discs are also typically used to cut and bury residue, to varying degrees. Several conventional machines, in an effort to have the soil in a fairly level condition by the time of the next planting season, use cooperating pairs of discs behind the tillage shanks to fill in furrows left by the shanks. Such discs typically are positioned to engage the two ridges produced by each advancing shank and to converge the ridges back into the shank's furrow whereby to create a raised berm that will settle down to a more level condition over the winter months before the next spring planting season. Some conventional machines also provide coulters at the front of the machine for residue-cutting purposes.

In one aspect the present invention is intended to provide an improved single-pass primary fall tillage machine which leaves the field in better condition for spring planting operations than has heretofore been possible. The machine not only cuts and partially buries residue left from harvesting operations, but also provides both deep and shallow tillage while leaving a smoother, more level field with smaller clod size.

The present invention provides a number of novel features, both individually and in combination. In one preferred embodiment, the machine has a group of laterally spaced, deep tillage shanks that are preceded by a transversely extending group of flat, residue-cutting coulters. Following the shanks is a group of soil-conditioning, concavo-convex discs that pulverize, level, and smooth the soil. Preferably, although not necessarily, the coulters are preceded by a gang of freely rotating residue wheels that engage and orient residue transversely for better severance by the coulters. Preferably, the residue wheels are each independently mounted, free-floating, and gravity-biased downwardly. The coulters are pressed downwardly as a group by a hydraulic hold-down circuit that allows the coulters to penetrate the soil to the extent necessary to achieve a firm backstop against which the coulters may cut the residue. The depth of penetration of the coulters is thus made independent of the depth of the tillage shanks, which are controlled by transport wheels on the main frame of the machine.

The conditioning discs at the rear of the machine are preferably arranged in at least two transversely extending, parallel rows with the discs of a trailing row being more closely spaced and greater in number than those of the front row. Preferably, the spacing of the discs in the trailing row is less than the spacing between the shanks, while the spacing of the discs in the front row is the same as the spacing between the shanks. While the discs in the front row are indexed with the shanks and are located to move soil from the shank ridge laterally back into the furrow behind the shank, the discs in the trailing row, being more closely spaced and angled in the opposite direction, serve the function of reducing clod size, mixing, and leveling the soil to provide a finish suitable for spring planting. Preferably, the discs of the conditioner are all individually mounted on transverse beams by generally C-shaped mounts, with at least the mounts of the discs in the trailing row having their open ends facing forwardly to minimize plugging. Best results are obtained when the discs of the trailing row are fluted.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

The tillage machine disclosed herein by way of example has a mobile main frame 10 that includes a pair of rearwardly diverging beams 12, 14 and a generally rectangular in plan box frame 16 rigidly affixed to beams 12, 14 beneath the same. Wheel assemblies 18 and 20 are secured to box frame 16 and support frame 10 for over-the-ground travel. Wheel assemblies 18 and 20 may be raised and lowered relative to frame 10 by hydraulic cylinders 22 and 24 for shifting the machine between a lowered, field working position as in FIG. 2 and a raised transport position as in FIG. 3. Cylinders 22, 24 are connected at their upper ends to a pair of respective, somewhat upwardly arched, fixed structural members 26 and 28 and at their lower ends to the wheel assemblies 18, 20.

Figure 2:
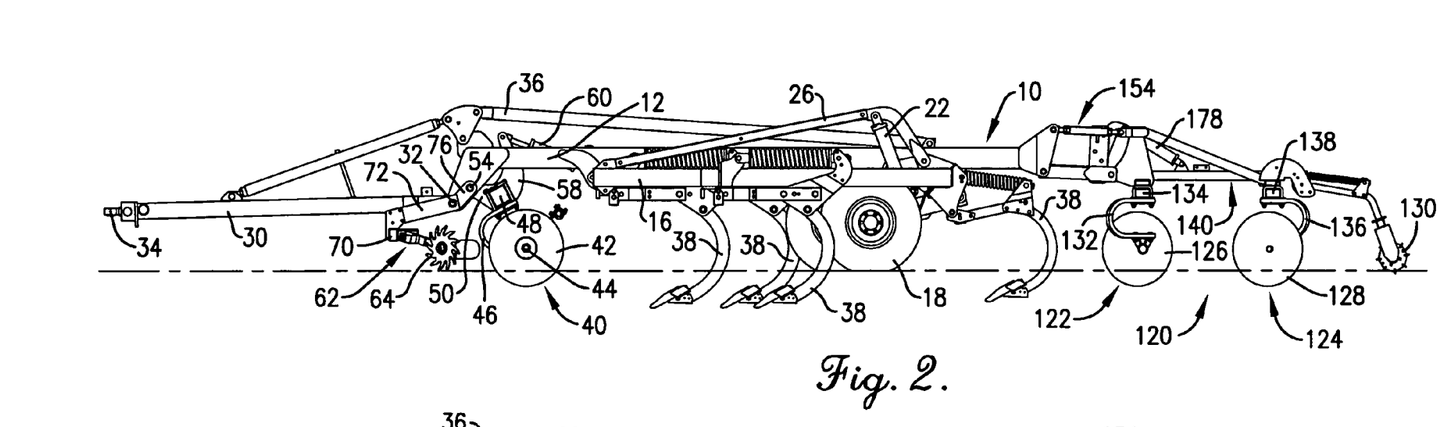
FIG. 2 is a side elevational view of such machine shown in its lowered, working position.
Figure 3:
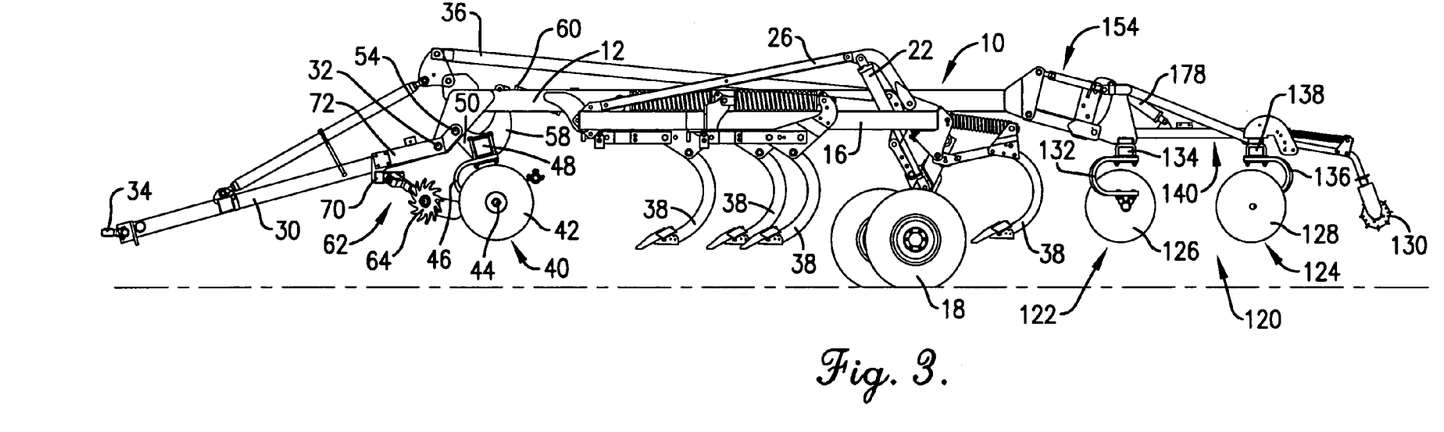
FIG. 3 is a side elevational view of the machine similar to FIG. 2 but illustrating the machine in its raised, transport position.
Figure 4:
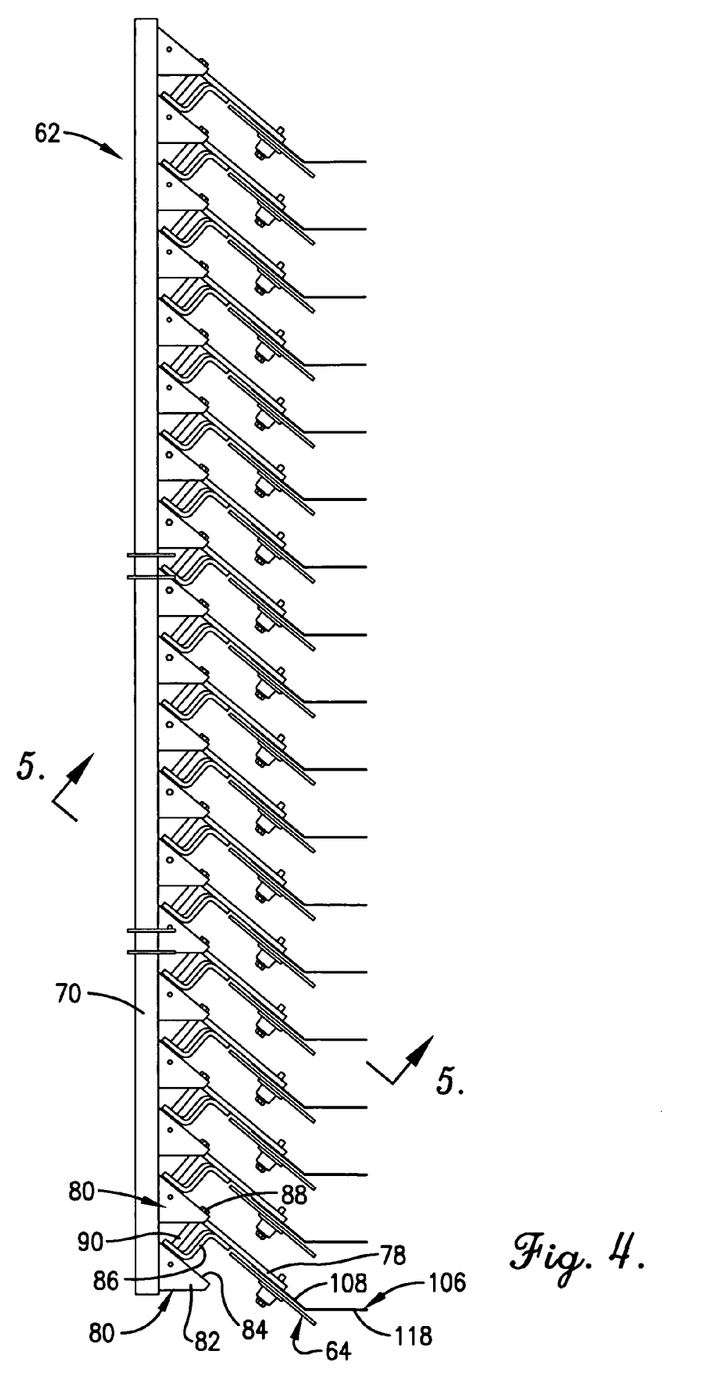
FIG. 4 is an enlarged, top plan view of a bank of residue wheels that may be attached ahead of the residue cutting coulters of the machine to orient residue for most effective severance by the coulters.

At the front end of frame 10 a generally triangular in plan hitch tongue 30 is pivotally connected to the beams 12 and 14 by horizontal pivots 32 to adapt hitch tongue 30 to swing upwardly and downwardly relative to main frame 10. Hitch tongue 30 is provided with a clevis 34 or the like at its forwardmost end for coupling the machine to a towing tractor (not shown). A linkage 36 of known construction connects hitch tongue 30 with wheel assemblies 18, 20 to maintain main frame 10 level during raising and lowering thereof, while hitch tongue 30 pivots between level and inclined conditions as illustrated in FIGS. 2 and 3.

The main frame 10 is provided with a group or squadron of deep tillage shanks 38 that are disposed at spaced locations across the machine. Shanks 38, including their lowermost points, may take a variety of different forms as well understood by those skilled in the art including, for example, parabolic deep till shanks, a combination of deep till and heavy-duty chisel shanks, or all chisel shanks. In a preferred embodiment, shanks 38 are arranged in two primary ranks, namely a front rank of five shanks across box frame 16 generally ahead of wheel assemblies 18, 20 and a rear rank of four shanks across the rear of box frame 16 in alignment with the four ground wheels associated with wheel assemblies 18 and 20. The shank pattern is such that the shanks of the rear rank are interposed between the shanks of the front rank on 18 inch spacing. No shank is closer than 36 inches on the same beam.

Mounted on main frame 10 forwardly of shanks 38 is a gang of flat residue-cutting coulters 40. In a preferred embodiment, each coulter 42 of the gang 40 has a diameter of 25 inches, and coulters 42 are arranged on 9 inch spacing with every other coulter 42 in line with one of the shanks 38. Coulters 42 cut through residue and penetrate hard soils ahead of shanks 38 so as to properly size the residue, reduce its tendency to collect and build up on shanks 38, and prepare a slit for the upper portions of shanks 38. Coulters 42 are freely rotatable about a common transverse axis 44 and are preferably provided with double beveled peripheral edges that provide a relatively sharp periphery for slicing through the residue.

Figure 9:
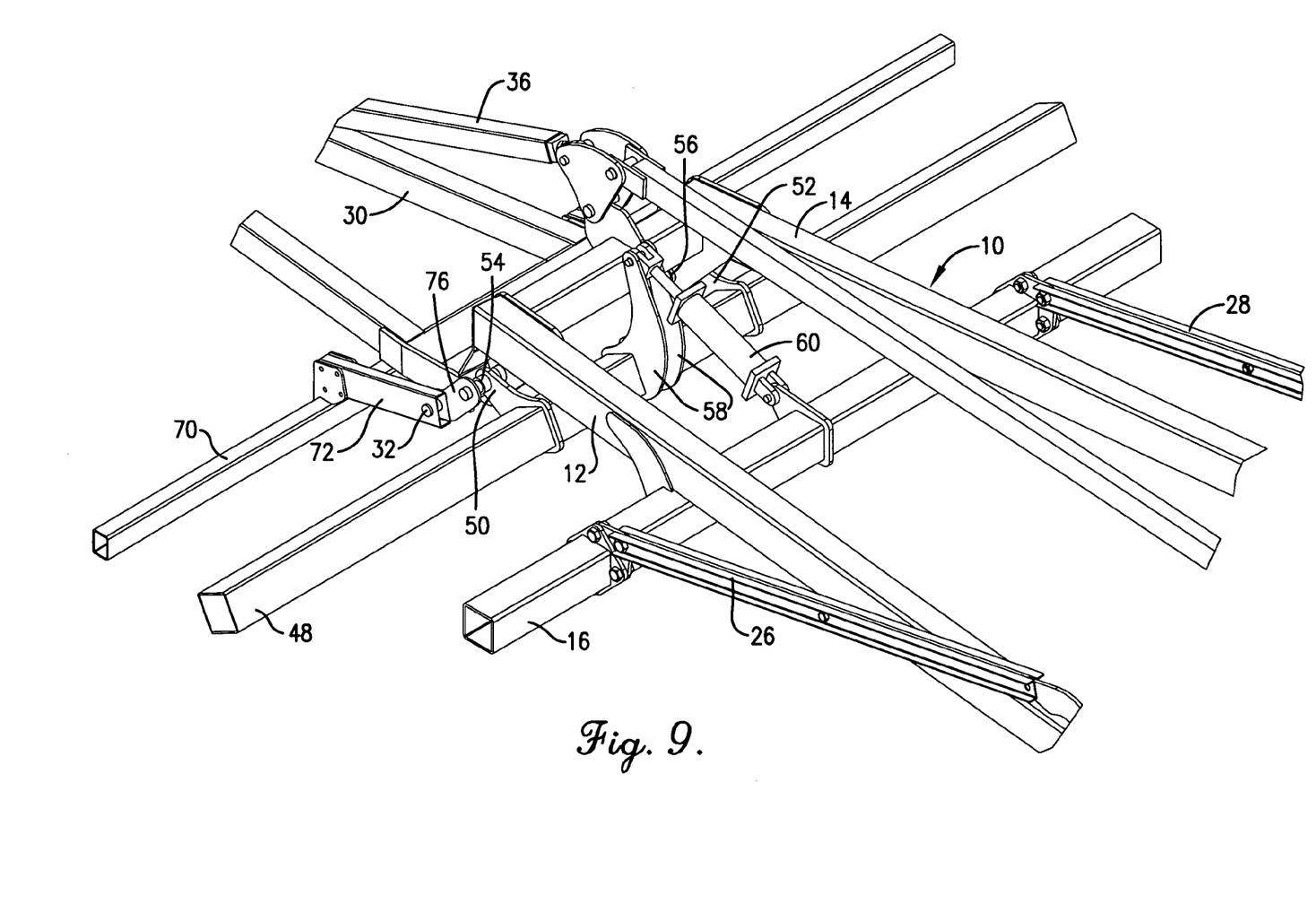
FIG. 9 is a fragmentary isometric view of the front of the machine illustrating the manner in which the tool bar for the cutting coulters is mounted to the main frame and coupled with the hydraulic hold-down circuit.
Figure 14:
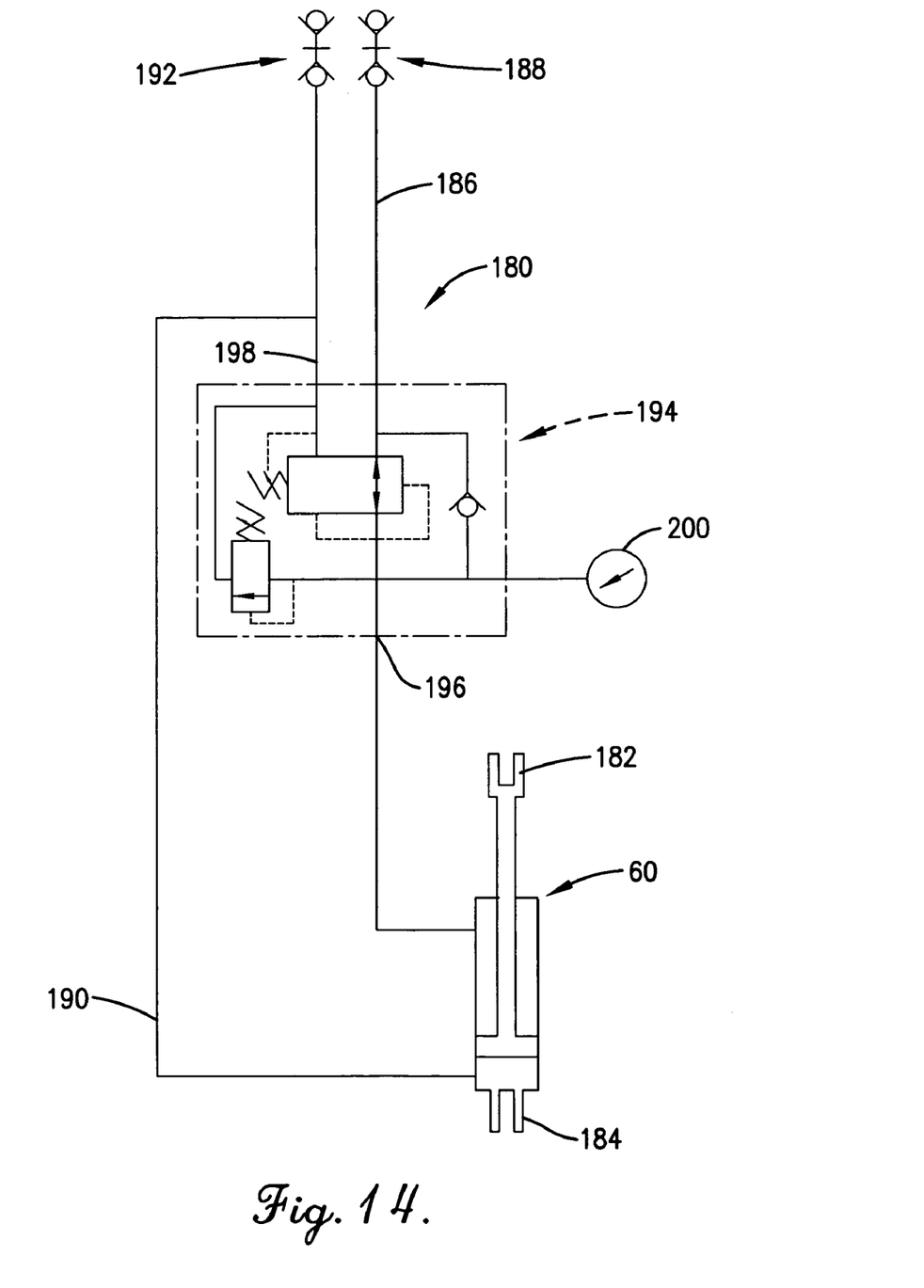
FIG. 14 is a schematic diagram of the hydraulic hold-down circuit associate with the residue-cutting coulters of the machine.

Coulters 48, as is well understood by those skilled in the art, are supported by a number of generally C-shaped mounts 46 secured to a common, transversely extending, tubular beam 48. Beam 48, in turn, is swingably secured to the front end of main frame 10 by a pair of lugs 50 and 52 as shown particularly in FIG. 9. Lugs 50, 52 are connected at their front ends to beams 12, 14 of main frame 10 by horizontal pivots 54 and 56 also shown in FIG. 9. To control up and down swinging movement of gang 40, cross beam 48 is provided at its center with an upwardly projecting crank 58 operably coupled at its upper end with a down pressure hydraulic cylinder 60. Hold-down cylinder 60 is connected at its rear end to box frame 16 and is operable not only to raise and lower gang 40 but to also maintain a constant live down pressure pushing gang 40 into the ground when the machine is in its working position of FIG. 2. Hold-down cylinder 60 is thus operable to maintain coulters 42 down in the soil to a depth of penetration determined by the hardness of the soil itself, regardless of the particular depth at which the shanks 38 are running. In other words, during field operations, the depth of coulters 42 is independent of shanks 38 in that shanks 38 are fixed to frame 10 and are depth-controlled by wheels 18, 20, while coulter gang 40 is depth controlled by hold-down cylinder 60 that is operable to move gang 40 up and down relative to frame 10 and shanks 38. A control circuit of which cylinder 60 is a part is illustrated in FIG. 14 and will hereinafter be described in more detail.

Figure 1:
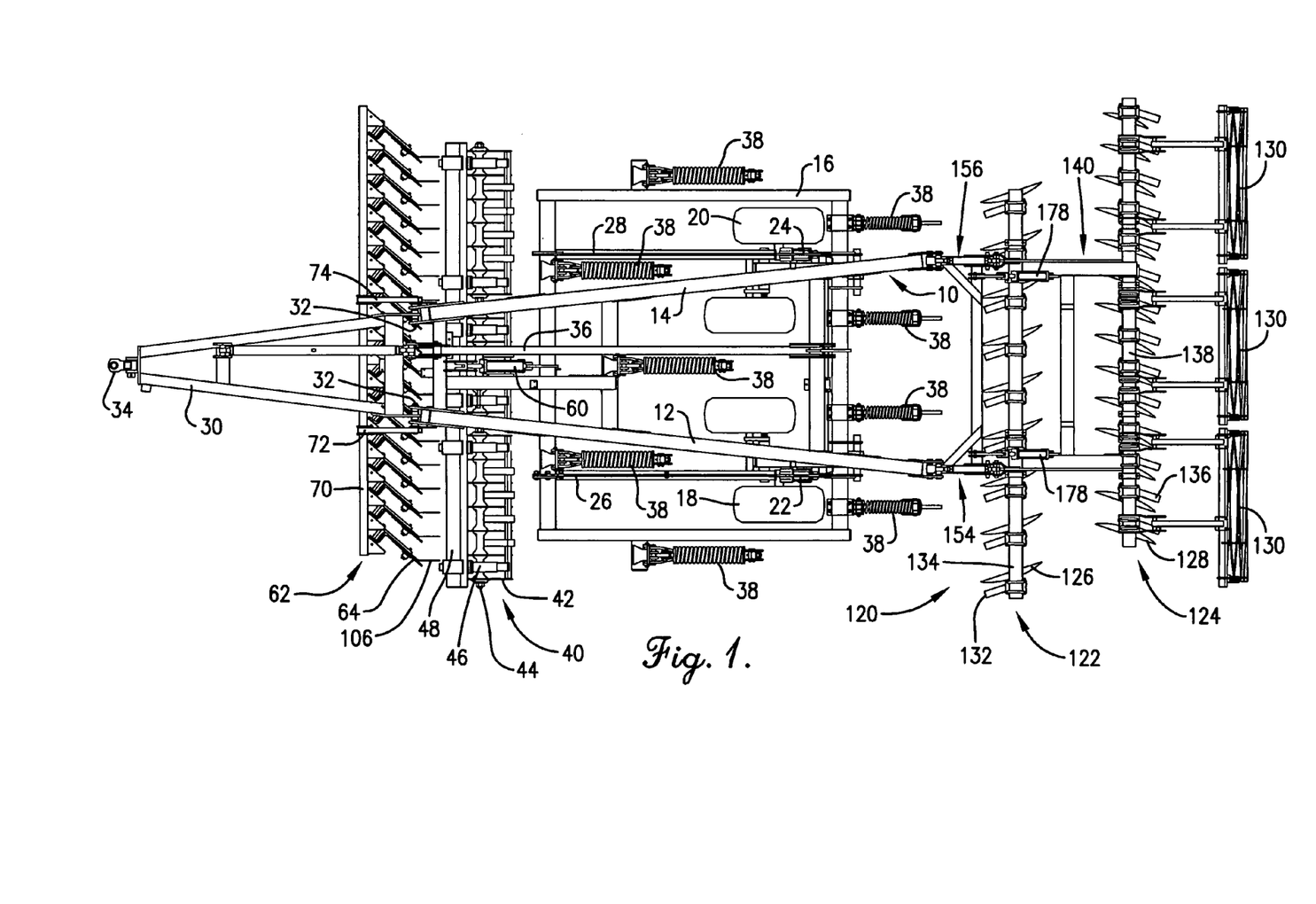
FIG. 1 is a top plan view of a tillage machine constructed in accordance with the principles of the present invention.

In a preferred embodiment of the invention, a residue managing attachment 62 is mounted on main frame 10 forwardly of coulter gang 40. The primary function of attachment 62 is to engage and reorient residue if necessary so that stalks and other elongated items which might initially extend lengthwise of coulters 42 are turned sideways to facilitate severance by coulters 42. Attachment 62 includes as its primary components a series of residue wheels 64, one for each coulter 42, which are arranged at an oblique angle relative to the path of travel of the machine and coulters 42. Moreover, each residue wheel 64 is laterally offset with respect to the coulter for which it orients residue as shown in FIG. 1. It will be noted in that figure that while each residue wheel 64 is aligned fore-and-aft with one particular coulter 42, it diverts residue to the next left adjacent coulter for severance.

Details of construction of attachment 62 and residue wheels 64 are illustrated in FIGS. 4–7. As illustrated in those figures in particular, each residue wheel 64 is of generally flat, plate-like construction with a plurality of generally radially outwardly projecting fingers 66. Each finger 66 tapers outwardly to a pointed tip 68 and is curved slightly rearwardly with respect to the normal direction of rotation of wheel 64 during ground engagement and forward motion of the machine. Wheels 64 rotate in a counterclockwise direction viewing FIGS. 5 and 6. It will be appreciated that wheels 64 may take other forms within the scope of the present invention, such as being of solid construction, but it has been found that spaced, rearwardly curved, pointed fingers work best.

The residue wheels 64 are all mounted for independent up and down swinging motion relative to one another but are carried by a common cross beam 70 that is suspended beneath the hitch tongue 30. As illustrated particularly in FIGS. 1 and 9, cross beam 70 is immovably affixed to main frame 10 by a pair of fore-and-aft arms 72 and 74 (arm 74 only being visible in FIG. 1), the rear ends of which are mounted on the pivots 32. Each arm 72 has an upwardly and rearwardly projecting stabilizing ear 76 rigidly affixed thereto that is attached to mainframe 10 at pivot 54 so as to keep arms 72 from swinging up and down about pivots 32.

Each residue wheel 64 is rotatably mounted to the outer end of a support arm 78 which is, in turn, swingably mounted at its inner end to the cross beam 70. Pivotal mounting of each arm 78 to cross beam 70 is accomplished through a cooperating pair of generally triangular in plan brackets 80 that are spaced apart along cross beam 70 and project rearwardly therefrom. Each bracket 80 includes a triangular top wall 82 and a rectangular downturned sidewall 84 that lies in a plane disposed at an approximately 45° angle to the path of travel of the machine. Adjacent its inner end, each support arm 78 is provided with a generally S-shaped arm 86 that cooperates with the inner end of arm 78 to present a mounting yoke that receives a transverse pivot bolt 88 and a sleeve 90 encircling bolt 88. Bolt 88 extends between the two sidewalls 84 of a pair of adjacent brackets 80 so as to swingably attach support arm 78 to cross beam 70.

Figure 5:
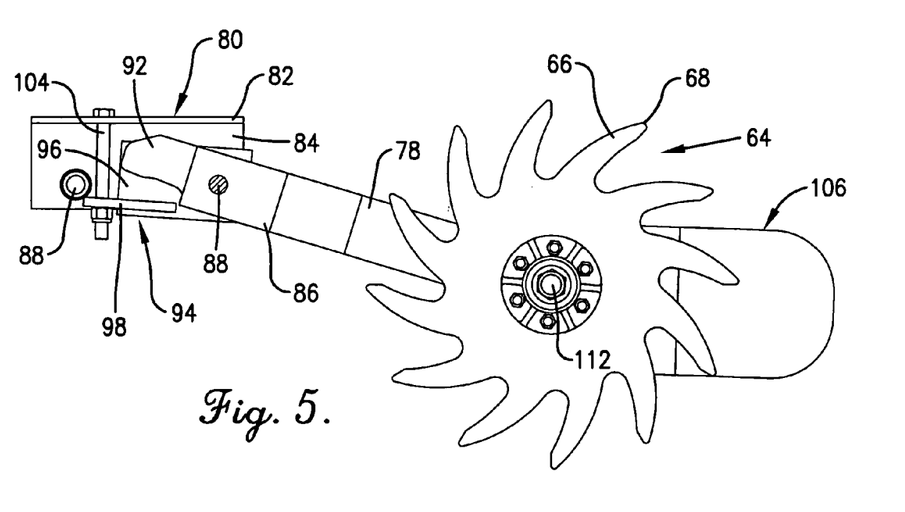
FIG. 5 is an enlarged cross-sectional view of one of the residue wheel assemblies taken substantially along line 5—5 of FIG. 4.
Figure 6:
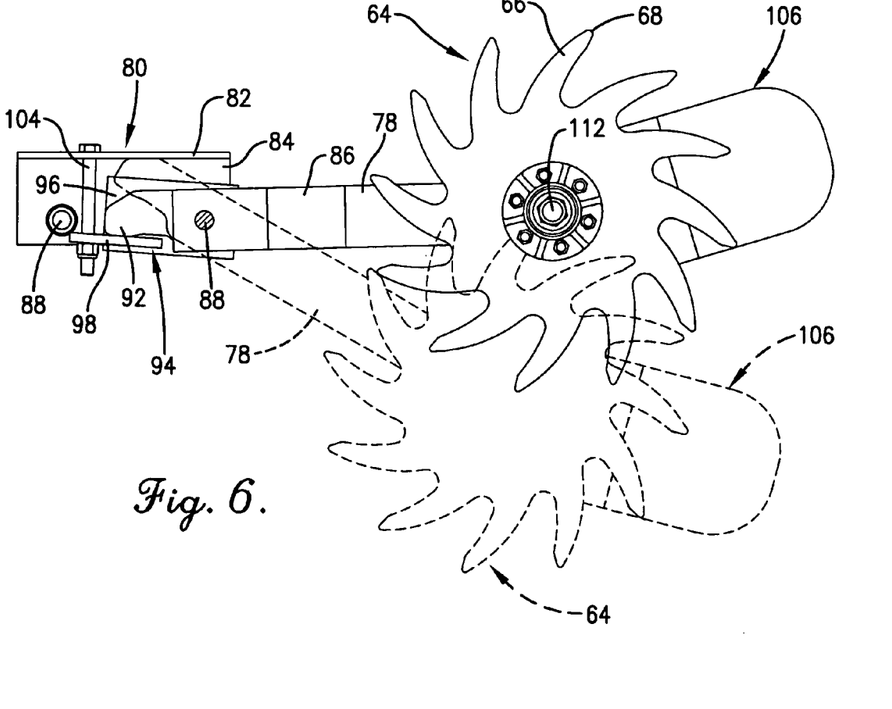
FIG. 6 is a view of a residue wheel assembly similar to FIG. 5 and illustrating upper and lower limits of floating travel of the residue wheel.
Figure 7:
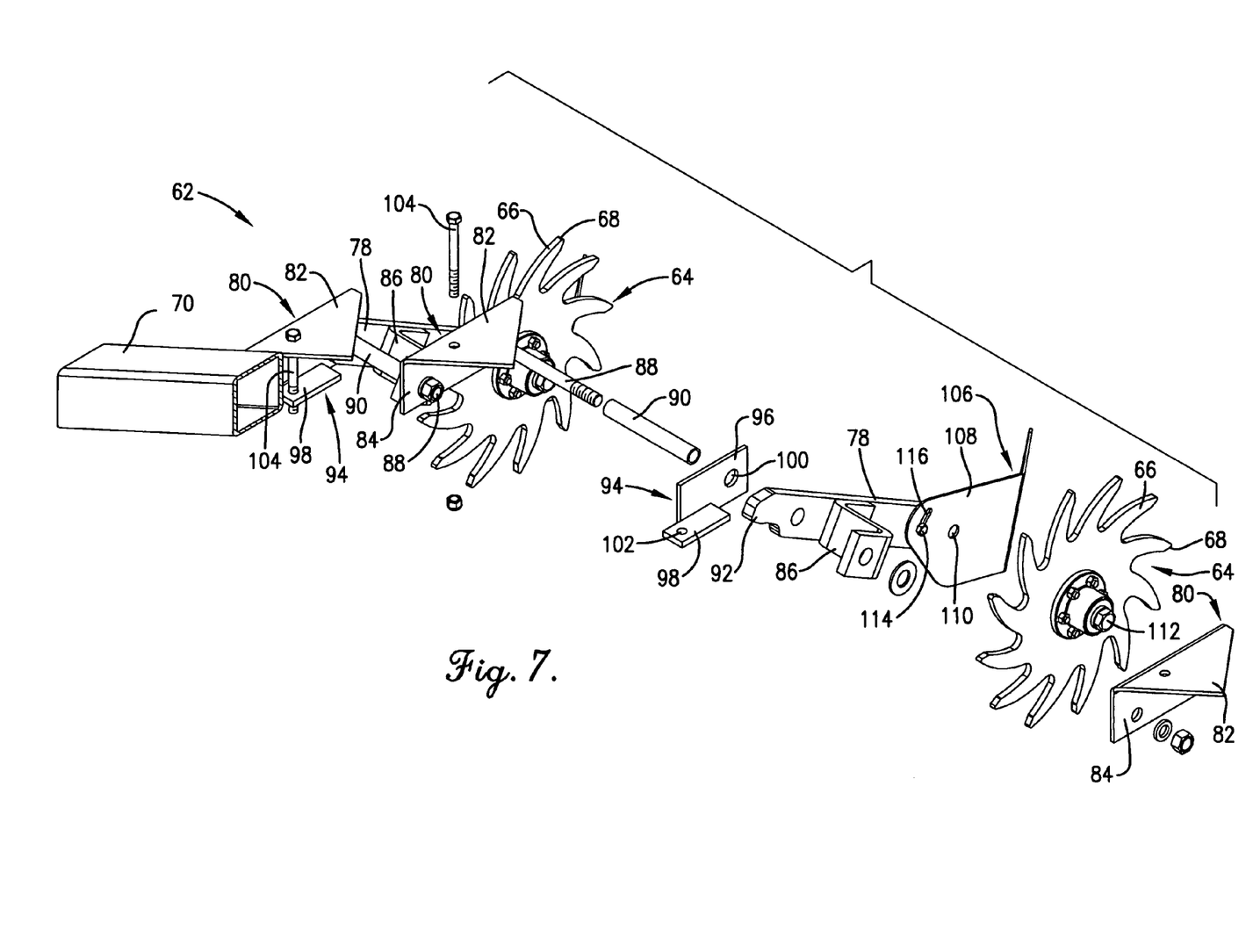
FIG. 7 is an exploded view of a portion of the gang of residue wheels illustrating details of construction.

Residue wheels 64 are gravity-biased downwardly by their own weight. To prevent excessive downward movement, each arm 78 is provided with a forwardly projecting extension 92 that is disposed to abut the underside of overhead top wall 82 after a predetermined amount of downward movement of the outer end of arm 78 such that top wall 82 serves as a limit stop for downward movement of wheel 64. At least several of the residue wheels 64 along beam 70, i.e., those directly under hitch tongue 30, are provided with stops to limit upward travel of those wheels. In this respect as illustrated in FIGS. 5, 6 and 7, those particular brackets 80 may be provided with a generally L-shaped stop weldment 94 comprising a vertical plate 96 and a horizontal plate 98. Vertical plate 96 has a hole 100 (FIG. 7) adjacent its front end through which the bolt 88 passes, while horizontal plate 98 has a hole 102 adjacent its forward end through which a vertical bolt 104 passes. Pivot bolt 88 and vertical bolt 104 thus attach stop weldment 94 to bracket 80, positioning horizontal plate 98 under extension 92 of arm 78 for engagement thereby at the end of the upward path of travel of wheel 64 as illustrated in FIG. 6.

Each residue wheel 64 has a generally horizontally L-shaped shield 106 associated therewith that is adjustably secured to the rearmost end of the corresponding support arm 78. Each shield 106 is formed from flat sheet material and has a forward leg 108 located between the wheel 64 and corresponding arm 78. A hole 110 (FIG. 7) in forward leg 108 receives the spindle 112 of the corresponding residue wheel 64 so that shield 106 can be pivoted upwardly and downwardly between adjusted positions. Retention in a selected position of adjustment is provided by a bolt 114 (FIG. 7) at the forwardmost end of leg 108 that passes though an arcuate slot 116 in forward leg 108. Manifestly, loosening of bolt 114 permits rocking adjustment of shield 106 about spindle 112 to the extent permitted by slot 116, while tightening of bolt 114 effectively retains shield 106 in a selected position of adjustment. Each shield 106 further includes a rear leg 118 projecting rearwardly from the rearmost extremity of forward leg 108 parallel with the path of travel of the machine.

As illustrated in FIG. 1, each shield 106 is generally aligned fore-and-aft with a corresponding one of the trailing coulters 42. Thus, the shield is in position to receive residue from the next residue wheel to the right as viewed in FIG. 1 and to prevent such residue from moving leftwardly past shield 106 to the next left adjacent coulter 42. This prevents an excessive amount of residue from being collected in front of any one coulter, which would impede the slicing ability of the coulter. The shield also has the effect of positioning the residue from the corresponding wheel 64 directly in front of its coulter for effective severance. Further, each shield 106 tends to lie on top of and pinch down the residue to prepare it for severance by the coulter and to cooperate in such severance.

Figure 10:
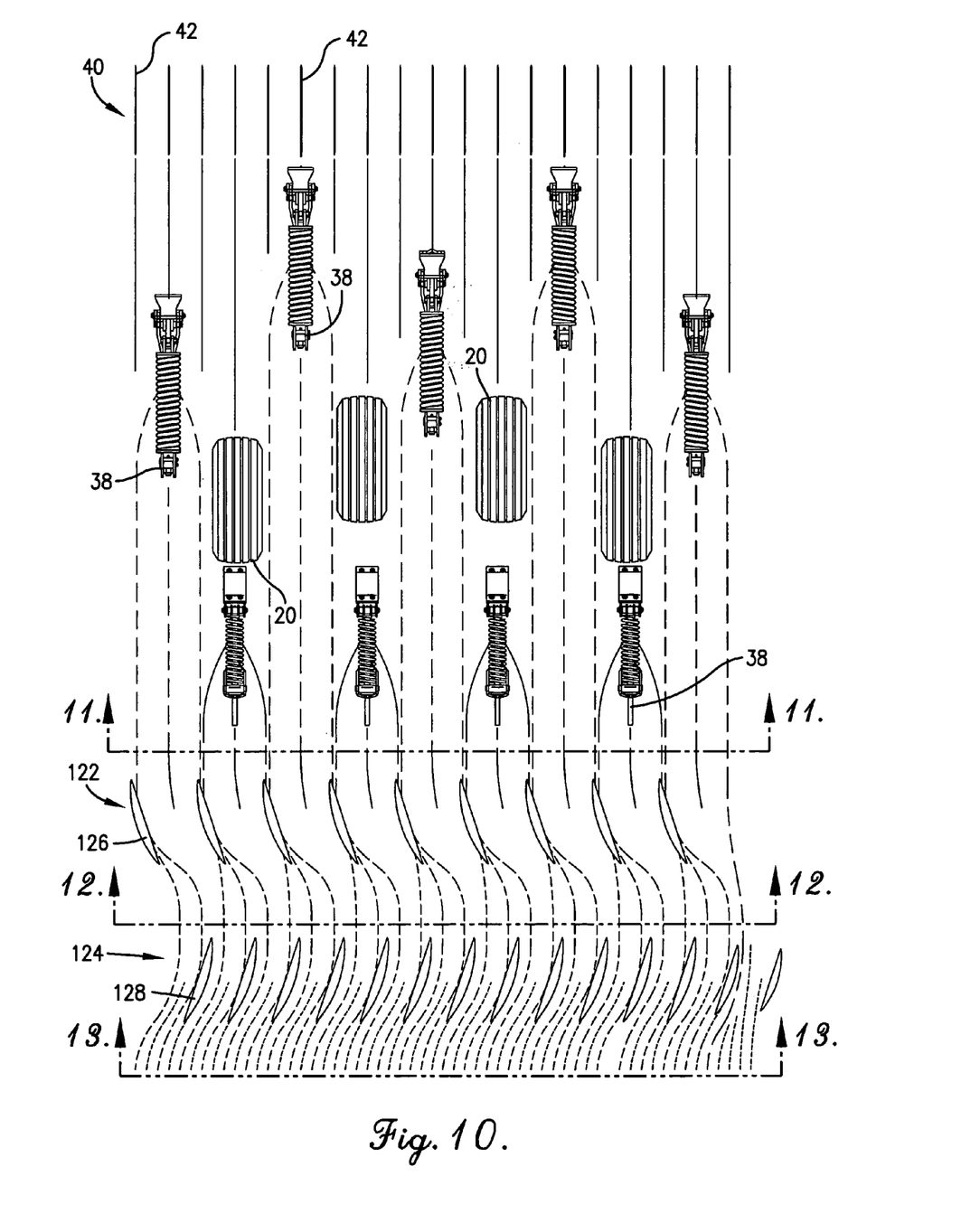
FIG. 10 is a schematic, top plan view of the various tools of the machine illustrating the manner in which they work the residue and soil to produce the desired field finish.

Supported at the rear of the machine is a group 120 of concavo-convex conditioning discs that mix residue into the soil behind shanks 38, reduce clod size, and level the field. The discs of the group are arranged in at least two transverse rows, namely a front row 122 and a trailing row 124. In one preferred embodiment, the discs of front row 122 are 24-inch smooth discs on 18-inch spacing with the discs indexed with respect to shanks 38. That is to say, as illustrated in FIGS. 1 and 10, each front disc 126 is disposed somewhat laterally offset from a corresponding, forwardly disposed shank 38 so as to be in position to receive one of the ridges from such shank and displace it laterally back toward the furrow left by the shank. As illustrated, the discs 126 of front row 122 are all obliquely disposed with respect to the path of travel of the machine so as to effect such lateral soil displacement action. In this respect, although discs 126 have been oriented to throw the soil toward the right as the machine is viewed in plan in FIG. 1, discs 126 could alternatively be angled in the opposite direction to throw the soil leftwardly, in which event the row 122 of discs would be displaced somewhat to the right of the position illustrated in FIG. 1 so that the rightmost disc would be outboard of the rightmost shank 38.

On the other hand, the discs 128 of trailing row 124 are preferably 24-inch fluted discs on 10-inch or 12-inch spacing and are angled oppositely to the front discs 126. Discs 128 of trailing row 124 are thus more closely spaced than shanks 38 and front discs 126, and there are more of the trailing discs 128 than the front discs 126. While front discs 126 cut clods and perform an initial leveling action by shifting some of the soil from a shank ridge into the furrow left by the shank, the trailing discs 128 function to reduce clod size still further and to leave a level field finish. Both front and trailing rows of discs 122 and 124 mix and partially bury residue into the soil. In the illustrated embodiment, the group 120 of conditioning discs is also provided with a set of rear, transversely extending reels 130 that further level and smooth the field, although such reels 130 are purely optional.

The discs 126 of front row 122 are all individually mounted for rotation about individual, transversely oblique axes rather than journalled on a common long shaft that is obliquely disposed. In this respect, each disc 126 has a generally C-shaped mount 132 that attaches the same to an overhead, tubular beam 134 extending perpendicular to the path of travel of the machine. Mounts 132 have open ends that face rearwardly with respect to the direction of travel of the machine.

Similarly, the discs 128 of trailing row 124 are mounted for rotating movement about individual transversely oblique axes rather than being mounted on an obliquely disposed common spindle or shaft. Each disc 128 is rotatably supported by a generally reversely C-shaped mount 136 that is attached at its upper end to a tubular beam 138 common to all of the discs 128 and extending in perpendicular relationship to the path of travel of the machine. It is to be noted that in contrast to front mounts 132, rear mounts 136 have their open ends facing forwardly while their closed ends face rearwardly. This unorthodox orientation of rear mounts 136 has been found to be especially beneficial in keeping the trailing row of discs 124 from plugging in spite of the narrow spacing thereof compared to front discs 126. While the flutes of trailing discs 128 sometimes tend to carry soil upwardly and rearwardly as the discs rotate counterclockwise viewing FIGS. 2 and 3, the rearwardly disposed bodies of mounts 136 tend to block and deter further upward travel of soil and direct it back down to the ground. If the open ends of mounts 136 faced rearwardly as with the front row of discs 122, there would be a greater tendency for uplifted soil from the closely spaced trailing discs 128 to be captured within the open areas defined by the C-shaped mounts 136, contributing to plugging.

Figures 8, 8A:
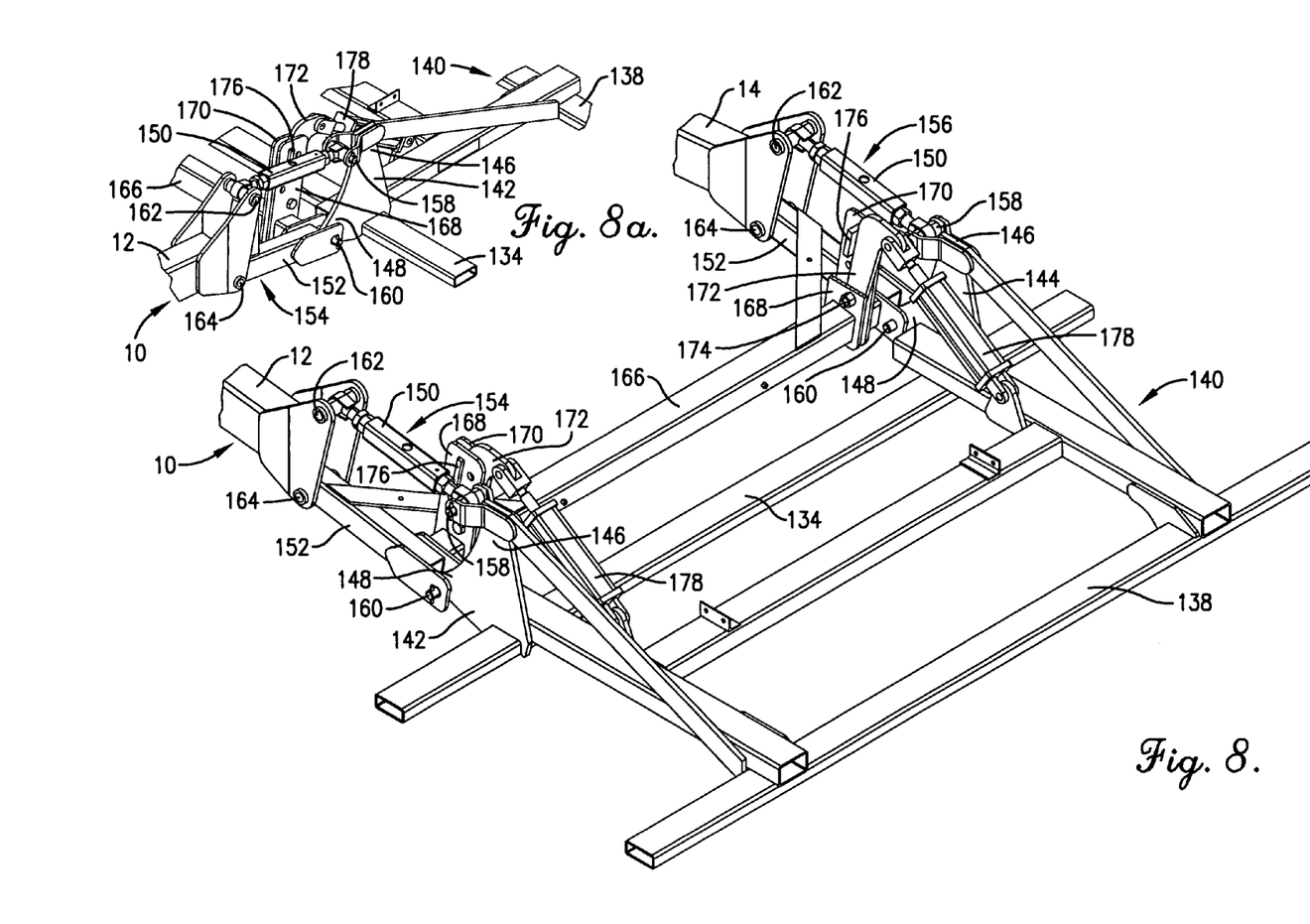
FIG. 8 is a fragmentary isometric view of the subframe that supports the conditioning discs at the rear of the machine.
FIG. 8a is a fragmentary isometric view of the disc conditioner subframe taken from a different angle than FIG. 8.

The disc beams 134 and 138 are both part of a subframe denoted broadly by the numeral 140 that is swingably attached to the rear end of main frame 10 for up and down swinging movement. Detailed views of subframe 140 are shown in FIGS. 8 and 8a. As illustrated therein, subframe 140 is generally rectangular in plan and has a pair of upstanding generally triangular mounting plates 142 and 144 rigidly affixed thereto adjacent its front end at widely spaced locations thereon. Mounting plates 142, 144 are provided with upper and lower corners 146 and 148 respectively which, in turn, are pivotally connected to upper and lower links 150 and 152 of respective four-bar linkages 154 and 156. Each four-bar linkage 154, 156 has an upper rear pivot connection 158 with plate corner 146 and a lower rear pivot connection 160 with lower plate corner 148. At its forward end, each linkage 154, 156 has an upper front pivot connection 162 with beam member 12 or 14 and a lower front pivot connection 164 with the same beam. Top links 150 are substantially the same length as lower links 152 such that as subframe 140 swings upwardly and downwardly, it remains generally level. Preferably, upper links 150 are in the nature of adjustable turnbuckles for selectively adjusting the length thereof.

The four-bar linkages 154 and 156 are rigidly interconnected by a torque tube 166 that spans the lower links 152 adjacent their rear ends. Two pairs of upstanding plates 168 and 170 are rigidly affixed to torque tube 166 adjacent opposite ends thereof. Each pair of plates 168, 170 pivotally supports an inverted, generally L-shaped member 172 having a pivotal connection 174 with plates 168, 170 adjacent its lower end. A stop 176 spans each pair of plates 168, 170 adjacent their upper ends to limit forward swinging of L-member 172. At its upper rear end, each L-member 172 is pivotally connected to the rod end of a hydraulic cylinder 178 that is pivotally connected at its anchor end to the subframe 140.

As a result of this arrangement, when cylinders 178 are in a retracted condition with L-members 172 away from stops 176, subframe 140, and thus the group of finishing discs 120, is free to float up and down to a limited extent as front and trailing discs 126 and 128 engage the ground during forward movement of the machine. Front and trailing discs 122 and 124 thus are gravitationally biased into the ground at this time. If it is desired to raise subframe 140, cylinders 178 are utilized for this purpose. However, initially, there is a certain amount of lost motion involved as the L-members 172 are swung forwardly until reaching the stops 176. Thereafter, further extension of cylinders 178 results in the entire subframe 140 and four-bar linkages 154, 156 being raised upwardly relative to main frame 10.

FIG. 14 illustrates a hydraulic hold-down circuit broadly denoted by the numeral 180 that includes the hold-down cylinder 60 for maintaining constant down pressure against the coulter gang 40. The rod end 182 of cylinder 60 is connected to coulter gang 40 via crank 58, while the anchor end 184 of cylinder 160 is connected to main frame 10. The geometry is such that fluid pressure attempting to contract cylinder 60 causes down pressure to be applied against coulter gang 40. If coulter gang 40 is out of the ground as illustrated in FIG. 3 when the machine is in its raised transport position, there is no resistance to downward swinging of coulter gang 40, and cylinder 60 fully retracts to lower gang 40 to its fullest extent.

As illustrated in FIG. 14, hold-down circuit 180 includes a pressure line 186 leading to the anchor end of cylinder 60 from a quick coupler 188 with the tractor hydraulic system (not shown). A return line 190 leads from the anchor end of cylinder 60 to another quick coupler 192 with the tractor hydraulic system. A control valve broadly denoted by the numeral 194 is interposed within supply line 186 between couplers 188 and cylinder 160 and is adapted to reduce the pressure of a constant supply of oil from the tractor. Valve 194 has an adjustable pressure reducing port 196 and internal valving that enables a portion of the flow that would otherwise pass through pressuring reducing port 196 to by-pass such port and exit valve 194 through by-pass line 198 that connects to return line 190 leading to tractor coupler 192. Valve 194 also includes an internal relief valve and is fluidically connected to a gauge 200 for displaying the pressure of the fluid supplied to the rod end of cylinder 60. One suitable valve for performing the desired pressure-reducing, by-pass, check and relief functions of valve 194 is available from Shoemaker Incorporated of Fort Wayne, Ind. as part no. 8136.

Operation

Figure 11:
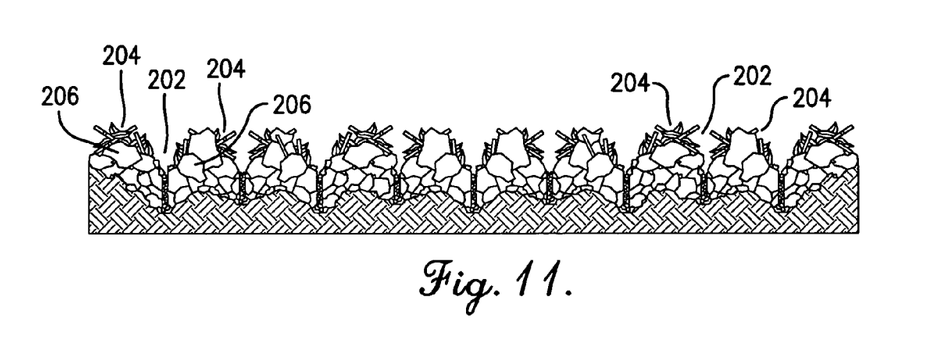
FIG. 11 is a fragmentary cross-sectional view taken substantially along line 11—11 of FIG. 10 and illustrating the condition of the field immediately behind the tillage shanks.

During field operations the machine is in the lowered operating position of FIG. 2. As the machine is drawn forwardly, the cross beam 70 associated with the residue managing unit 62 knocks down standing residue, and residue wheels 64 engage and orient stalks transverse to the trailing coulters 42. Coulters 42, under the influence of cylinder 60, penetrate the residue and soil until encountering sufficient resistance to preclude further downward movement thereof, thus being provided with an anvil-like backstop against which the residue can be cleanly severed into shorter lengths by the coulters 42. Shanks 38 enter the slits prepared by coulters 42 and deeply till and fracture the soil creating, as illustrated in FIG. 11, a series of furrows 202 bounded on opposite sides by ridges 204 of chunky soil and residue left by the wake of each shank 38. This action is also illustrated in FIG. 10. At this stage, relatively large chunks or clods 206 exist in the ridges 204.

Figure 12:
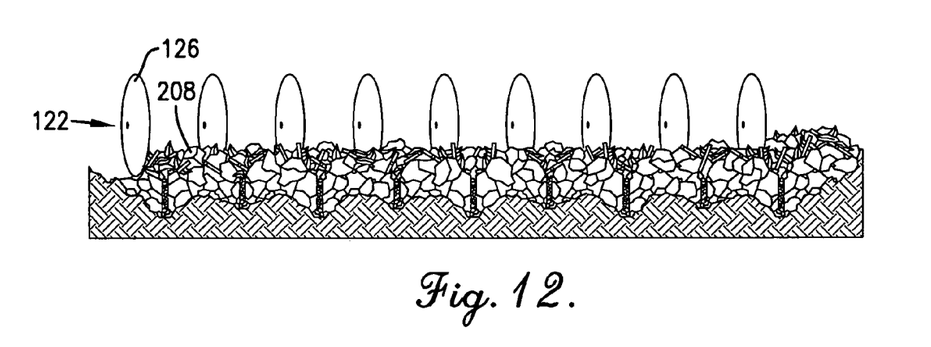
FIG. 12 is a fragmentary cross-sectional view taken substantially along line 12—12 of FIG. 10 and illustrating the condition of the soil immediately behind the first row of rear conditioning discs.
Figure 13:
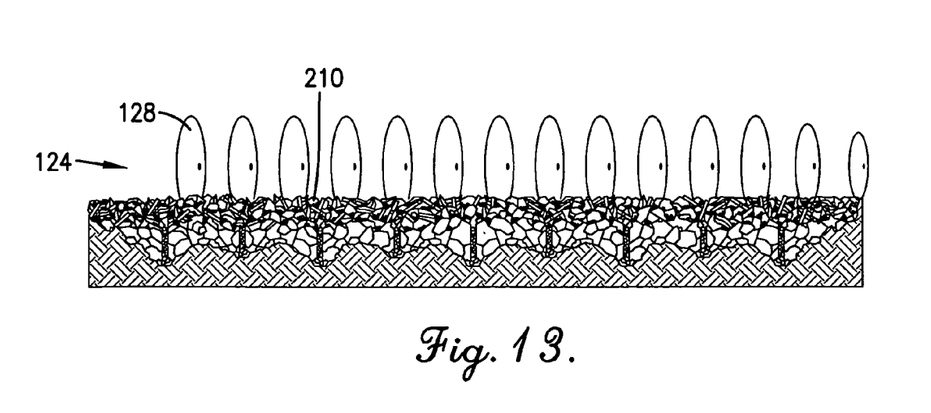
FIG. 13 is a cross-sectional view taken substantially along line 13—13 of FIG. 10 and illustrating the condition of the soil immediately behind the trailing row of soil conditioning discs.

When the ridges 204 are engaged by the front row of conditioning discs 122, the discs 126 thereof cut the clods 206 into smaller sizes to produce smaller clods 208 as illustrated in FIG. 12. Furthermore, the discs 126 throw the soil and residue from ridges 204 rightwardly into furrows 202 so as to produce a relatively level condition as illustrated in FIG. 12, at the same time performing a degree of mixing of the residue into the soil. When the soil is then engaged by the trailing row of conditioning discs 128 as illustrated in FIGS. 10 and 13, the relatively closely spaced trailing discs 128 have the effect of further cutting the clods to produce yet smaller clods 210, to further mix the residue and soil, and to significantly smooth and level the soil. Ideally, no ridges or berms are left when the machine of the present invention has completed its work within a field.

It will be noted as illustrated particularly in FIG. 13, and as also seen in FIG. 1, that the discs 128 of trailing row 124 progressively taper toward smaller diameters as the right end of the row is approached. In the illustrated embodiment, the next-to-last disc 128 on the right is smaller than the other discs to the left, while the rightmost disc at the end of the row 124 is even smaller than its next adjacent disc to the left. This helps prevent the formation of a berm at the right end of the trailing row of discs 124. It will be further appreciated that the addition of reels such as the reels 130 to the conditioning discs 120 aids in further reducing clod size and leveling the field.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In a tillage machine, the improvement comprising:
a mobile frame;
a group of flat residue cutting coulters extending across the path of travel of the machine and supported on the frame for rotation about transverse axes of rotation;
a group of deep tillage shanks extending across the path of travel of the machine and supported on the frame behind said coulters for fracturing the subsoil and creating furrows behind the shanks with ridges containing chunks of soil on opposite sides of the furrows; and
multiple rows of individually mounted, rotatable, laterally spaced, concavo-convex discs extending across the path of travel of the machine and supported on the frame behind said tillage shanks for pulverizing the chunks, leveling out the ridges and furrows, and mixing residue into the soil,
said deep tillage shanks being devoid of sweeps and having lowermost points adapted to run at depths substantially below the discs without overlapping one another in a transverse direction across the path of travel of the machine.

2. In a tillage machine as claimed in claim 1,
said rows of discs comprising a front row of discs and a trailing row of discs,
the discs in said trailing row being more closely spaced and greater in number than the discs in said front row.

3. In a tillage machine as claimed in claim 2,
the discs in said front row being obliquely angled in one lateral direction and the discs in said trailing row being obliquely angled in the opposite lateral direction.

4. In a tillage machine as claimed in claim 3,
the discs in said front row being disposed to throw soil to the right relative to the path of travel of the machine as viewed in top plan, and the discs in said trailing row being disposed to throw soil to the left relative to the path of travel of the machine as viewed in top plan.

5. In a tillage machine as claimed in claim 2,
the discs in said front row including one disc for each of said tillage shanks.

6. In a tillage machine as claimed in claim 1,
said front and trailing rows of discs being mounted on a common subframe that is vertically swingably attached to said frame,
said subframe being gravity-biased downwardly.

7. In a tillage machine as claimed in claim 1,
further comprising a transversely extending series of freely rotatable, ground-engaging residue wheels supported on the frame ahead of said coulters,
each of said residue wheels being obliquely angled with respect to the path of travel of the frame in a manner to direct residue toward the coulters for severance by the coulters.

8. In a tillage machine as claimed in claim 7,
each of said residue wheels being mounted for up and down movement independently of the other residue wheels.

9. In a tillage machine as claimed in claim 8,
each of said residue wheels being gravity-biased downwardly.

10. In a tillage machine as claimed in claim 7,
each of said residue wheels having a series of circumferentially disposed, generally radially outwardly projecting fingers.

11. In a tillage machine as claimed in claim 10,
each of said fingers being outwardly and rearwardly curved with respect to the direction of rotation of the residue wheel during normal ground-engaging operation.

12. In a tillage machine as claimed in claim 1,
said group of coulters being mounted on a common subframe that is shiftably connected to said frame for up and down movement relative to the frame,
said subframe having pressure-operated hold-down mechanism operably coupled therewith for pushing the coulters against the ground with a predetermined amount of hold-down force.

13. In a tillage machine as claimed in claim 12,
said hold-down mechanism including at least one hydraulic cylinder and a hydraulic circuit operable to maintain a constant pressure in said cylinder.

14. In a tillage machine, the improvement comprising:
a mobile frame;
a group of flat residue cutting coulters extending across the path of travel of the machine and supported on the frame for rotation about transverse axes of rotation;
a group of tillage shanks extending across the path of travel of the machine and supported on the frame behind said coulters; and
multiple rows of individually mounted, rotatable, laterally spaced, concavo-convex discs extending across the path of travel of the machine and supported on the frame behind said tillage shanks,
said multiple rows of discs comprising at least a front row of discs and a trailing row of discs,
each disc in said front and trailing rows having a generally C-shaped mount supporting the disc below a support member,
each mount having a closed end and an open end,
the mounts for at least said trailing row of discs having their open ends facing forwardly with respect to the direction of forward travel of the machine.

15. In a tillage machine, the improvement comprising:
a mobile frame;
a group of flat residue cutting coulters extending across the path of travel of the machine and supported on the frame for rotation about transverse axes of rotation;
a group of tillage shanks extending across the path of travel of the machine and supported on the frame behind said coulters; and
multiple rows of individually mounted, rotatable, laterally spaced, concavo-convex discs extending across the path of travel of the machine and supported on the frame behind said tillage shanks,
further comprising a transversely extending series of freely rotatable, ground-engaging residue wheels supported on the frame ahead of said coulters, each of said residue wheels being obliquely angled with respect to the path of travel of the frame for engaging and orienting residue in preparation for severance by the coulters, each of said residue wheels having a shield associated therewith and projecting rearwardly therefrom generally parallel with the path of travel of the machine for confining residue from the next adjacent residue wheel.

16. In a tillage machine having a group of laterally spaced tillage shanks and a group of rotatable, ground-engaging, concavo-convex discs behind the shanks, the improvement comprising:

said group of discs comprising at least a front row of laterally spaced discs and a trailing row of laterally spaced discs, the discs in said trailing row being more closely spaced and greater in number than the discs in said front row, each disc in said front and trailing rows having a generally C-shaped mount supporting the disc below a support member, each mount having a closed end and an open end, the mounts for at least said trailing row of discs having their open ends facing forwardly with respect to the direction of forward travel of the machine.

17. In a tillage machine having a group of laterally spaced tillage shanks and a group of rotatable, ground-engaging, concavo-convex discs behind the shanks, the improvement comprising:

said group of discs comprising at least a front row of laterally spaced discs and a trailing row of laterally spaced discs, the spacing between the discs in said trailing row being less than the spacing between said shanks, each disc in said front and trailing rows having a generally C-shaped mount supporting the disc below a support member, each mount having a closed end and an open end, the mounts for at least said trailing row of discs having their open ends facing forwardly with respect to the direction of forward travel of the machine.

18. In a tillage machine having a group of laterally spaced tillage shanks and a group of rotatable, ground-engaging, concavo-convex discs behind the shanks, the improvement comprising:

said group of discs comprising at least a front row of laterally spaced discs and a trailing row of laterally spaced discs, the spacing between the discs in said trailing row being less than the spacing between said shanks, further comprising a group of residue cutting coulters positioned ahead of said shanks, further comprising a transversely extending series of freely rotatable, ground-engaging residue wheels supported ahead of said coulters, each of said residue wheels being obliquely angled with respect to the path of travel of the machine for engaging and orienting residue in preparation for severance by the coulters, each of said residue wheels having a shield associated therewith and projecting rearwardly therefrom generally parallel with the path of travel of the machine for confining residue from the next adjacent residue wheel.

* * * * *